Nov. 14, 1972  S. L. HALLERBACK  3,702,720
DEVICE FOR THE APPLICATION OF ROLLING BEARINGS
Filed May 3, 1971
FIG. 1.
(Prior Art)
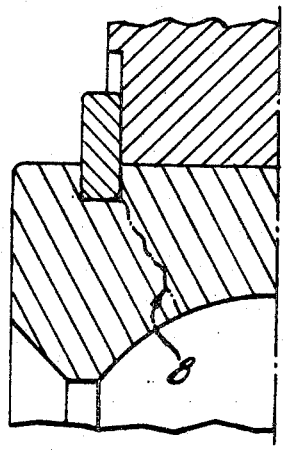
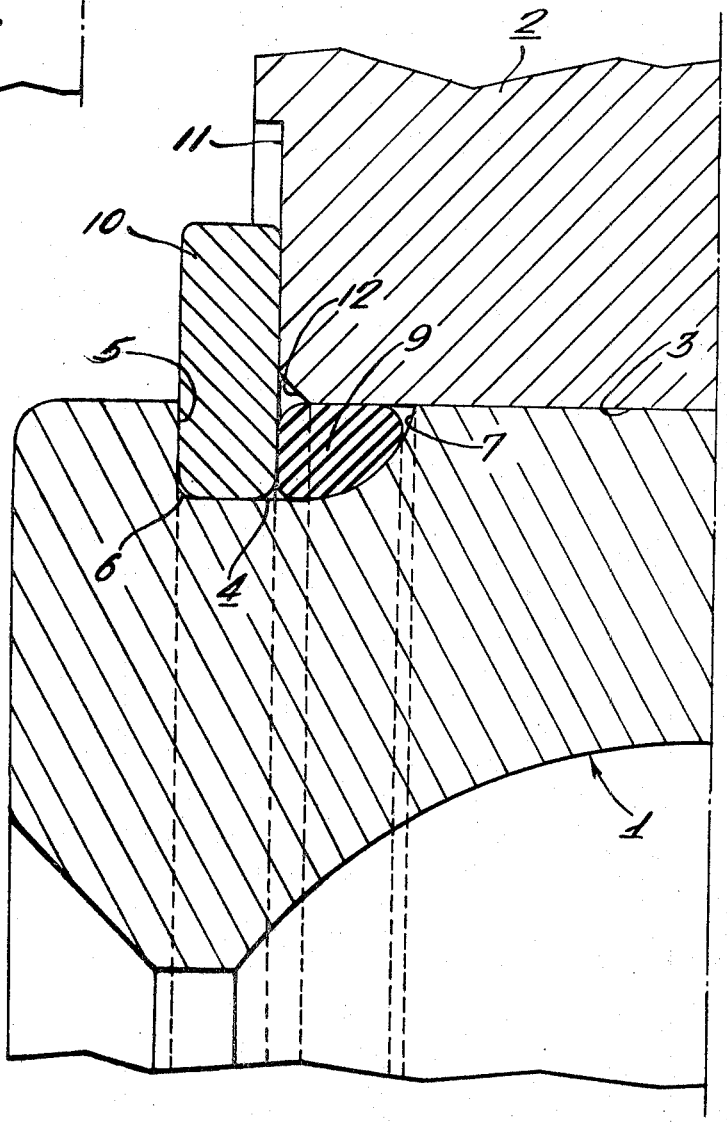
FIG. 2.

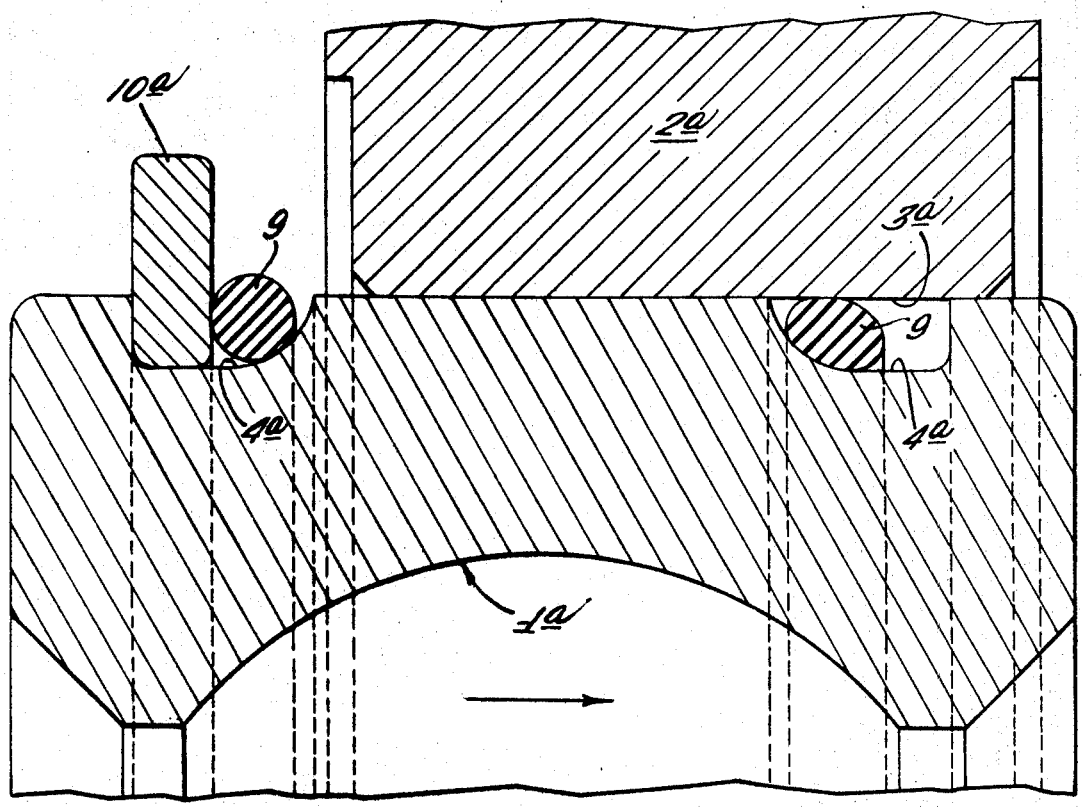

United States Patent Office                                      3,702,720
                                                                Patented Nov. 14, 1972

3,702,720
DEVICE FOR THE APPLICATION OF ROLLING BEARINGS
Stig Lennart Hallerback, Vastra Frolunda, Sweden, assignor to SKF Industrial Trading and Development Company, N.V., Overtoom, Amsterdam, Netherlands
Filed May 3, 1971, Ser. No. 139,626
Int. Cl. F16c 33/30
U.S. Cl. 308—236                                    4 Claims

ABSTRACT OF THE DISCLOSURE

A device for the application of a rolling bearing intended to fix the bearing axially when mounted and to prevent so-called rolling of the bearing ring by its contact with the surface of the seat, characterized thereby that grooves of a specific shape have been provided near one or both of the side edges of the outer and/or inner periphery of the bearing race ring, whereby an annular member of a resilient material has been inserted in the part of the groove facing the center of the bearing, which member is intended to cooperate with the surface of the bearing seat under compression, and that in the same groove a ring of a rigid material is snapped, which ring is intended partly under compression to cooperate with said resilient member, and partly to fit against a supporting plane formed in connection to the surface of the bearing seat.

The present invention relates to a device in connection to rolling bearings intended to achieve axial fixation of the bearing in a mounted position without any help of covers or other elements belonging to the application and to prevent "rolling" of the outer bearing race ring in its position, i.e. if the ring for some reason tends to rotate relative to the direction of the load.

To eliminate the rolling effect of a bearing several solutions have been proposed earlier. For example inserts have been provided, e.g. of soft metallic or plastic material, between the outer ring and the bearing seat, with approximately the same width as the ring. This can, however, cause that a bearing which is subjected to shock loads will be resilient, which means that the desired rigidity of the bearing cannot be obtained.

Furthermore, it is known to place one or more elastic rings in grooves or recesses in either the outer surface of the bearing ring or in the inner surface of the bearing seat. Such an arrangement can cause a certain prevention of rolling, but the mounting is difficult to carry out since elastic rings of this kind are easily bent out of position and are difficult to get in position. It is also difficult to achieve a desired compressibility in such rings when they are placed in closed grooves. Should the ring be over-dimensioned, the mounting would be very difficult. Grooves in the bearing seat are also very expensive to achieve, since a separate machining operation is needed.

To obtain axial fixation of a bearing it is previously known to provide a locking ring in a groove in the periphery of the outer bearing ring near its side surface, whereby the part of the locking ring projecting outside of the groove will be pressed against a surface in a bearing housing or the like. The above-mentioned groove is machined into the outer surface of the race ring by a turning steel with straight edges, whereby the corners of the bottom of the groove will show a relatively sharp configuration. This fact causes the disadvantage that when such a bearing is applied in an application where it will be exposed to strong, varying loads, for example in a gear box, there can easily occur cracks originating from the sharp corner in the groove and aiming at the race of the outer ring with a following break-down. This arrangement of the prior art illustrating the type of failure discussed above is shown in FIG. 1 of the drawings.

In order to avoid the disadvantages of the above-mentioned known arrangements, according to the invention a device is now suggested which is essentially characterized by that grooves are provided close to one or both the side edges of the inner or outer periphery of a bearing race ring which grooves have a special form, whereby in that part of the said groove which is facing the centre of the bearing are inserted an annular member of a resilient material intended to be pressed against a surface cooperating with the bearing ring, and that in the same groove a ring of a rigid material is snapped before or after the mounting of the bearing, which ring is intended partly to cooperate with the resilient member under pressure and partly to fit to a side plane provided in connection with the bearing. Another advantage is achieved at the mounting of a bearing in a seat, if a bevel is made at one side plane of the bearing seat, by which a considerable pressure increase can be achieved, when the resilient member inserted in the groove comes into contact with the rigid ring by its snapping in the same groove. The snap ring is provided with rounded edges at its bore to simplify the snappng and to improve said pressure increase in the resilient member.

These and other objects of the present invention are hereinafter more fully set forth with reference to the accompanying drawings.

FIG. 1 is a fragmentary view of a prior art arrangement for fixing the ring of the bearing on a housing;

FIG. 2 is a fragmentary sectional view of the bearing mounting means in accordance with the present invention;

FIG. 3 is a view showing the mounting means at opposite axial ends of an outer ring.

The invention will now be further described in connection to the accompanying drawing in which the device is shown in an application of a deep groove ball bearing, which is shown as an example. Only the outer ring of the bearing is shown, and a housing or wall part 2 with its bearing seat 3 is also shown. In the embodiment of the invention illustrated in FIG. 3, two grooves 4a are provided in the periphery of the outer ring, which grooves are situated close to the side planes of the ring. In such cases when the application requires it (see FIG. 2), only one groove 4 can of course be used at the side plane where the device is to be applied. At that part which is facing the side plane of the ring the groove is provided with a plane wall 5 which unites to the bottom of the groove with a soft radius 6.

At that part which is facing the centre of the bearing the wall of the groove has an arc-shaped surface 7 which takes up essentially half of the total inner surface of the groove. By forming the groove in this special way a room is achieved, which is a combination of a snap ring and an O-ring groove, and such a groove can be made in one single operation, which makes the construction cheaper.

When the bearing is built in, as shown in the figures, a resilient member 9 is placed in the inner part of the groove and, which can be seen, the member will be pressed between the ring 1 and the bearing seat 3 by the fact that an oversize of the resilient member suitable for such an action is chosen. The above-mentioned form of the groove provides that an advantageous effect from a rolling-preventing point of view is obtained. By the shape of the groove the risk for cracks is avoided, which occurs if a groove with sharp corners in the bottom is provided in the ring. This case has been indicated with the dash-and-dotted line at 8 in the prior art arrangement shown in FIG. 1.

In the opposite part of the groove a locking ring 10 is placed, which is made of a rigid material and preferably of a snap type. This ring serves two purposes: partly further to improve the rolling-diminishing effect of the member 9 by pressing on it, and partly to fit against a side plane 11 in the housing 2 with that part of the ring that projects out of the groove whereby the effect of fixing the bearing axially is achieved. The locking rings are preferably provided with radii at their bores, which have the purpose of simplifying the snapping-on of the ring in the groove 4 and also to participate in obtaining an increase of the pressure of the resilient member.

The mounting of the device in the bearing application is very simple. With a bearing with one groove (FIG. 2) for the device, the resilient member is placed in the groove together with the locking ring and the bearing is pushed into its seat until it has reached the proper position in axial direction, i.e. when the locking ring fits against the plane 11.

To simplify the entering of the resilient member in the bearing seat it could preferably be provided with a bevel 12. This bevel in combination with a suitably dimensioned resilient member also presses the member considerably at the last phase of the snapping of the rigid ring into the groove.

Mounting of the bearing intended for a double-sided device (FIG. 3) is carried out so that one of the resilient members is placed in the right hand groove and the other resilient member is placed in the left hand groove together with one of the locking rings. Thereafter, the bearing is pushed into the seat from the left, whereby the resilient member, alone in its groove, rolls into position against the concave surface in the groove. The bearing is then further pushed into the seat until the left hand locking ring contacts its side plane in the bearing seat. The resilient member in the right hand groove is then situated in its exact position in the bearing seat and the locking ring related to this groove is snapped into position, whereby a combined action of axial fixation and rolling prevention is achieved. The position of the resilient member at the side plane of the bearing causes that a higher pressure is achieved in the resilient material and by the configuration of the groove this will be filled up as much as possible.

I claim:

1. A device for mounting a rolling bearing including a bearing race ring in a member having a bearing seat in a manner to fix the rolling bearing axially when mounted and to prevent so-called rolling of the bearing race ring with the surface of the seat comprising means defining a groove of a predetermined shape adjacent at least one edge of the peripheral surface of the race ring confronting the seat, an annular member of a resilient material inserted in the part of said groove facing the center of the rolling bearing, said annular member being intended to cooperate with the surface of the bearing seat under compression, and a ring of a rigid material in said groove, said ring being intended partly under compression to cooperate with said resilient annular member, and partly to fit against a supporting plane formed in connection to the surface of the bearing seat.

2. A device according to claim 1, characterized thereby that said groove, which is provided in the periphery of the bearing race ring in one machining operation, is formed as a well parallel to the side plane of the bearing at that part of the groove facing said side plane, while the part of the groove facing the center of the bearing consists of an arc-shaped surface taking up essentially half the inner surface of the groove.

3. A device according to claim 1, characterized thereby that for the application of a bearing in a bearing seat, said seat being provided with a bevel at its side plane, the purpose of which bevel is partly to simplify the entering of said resilient annular member into the seat and partly to establish a pressure increase in the resilient annular member after the snapping into the groove of said rigid ring.

4. A device according to claim 1, characterized by that said rigid ring is provided with rounded edges at its bore for simplifying snapping into said groove and for providing a pressure increase in the resilient annular member.

References Cited

UNITED STATES PATENTS 1,908,295   5/1933   Leister _____ 308—236

MILTON KAUFMAN, Primary Examiner

F. SUSKO, Assistant Examiner